Figure 1:
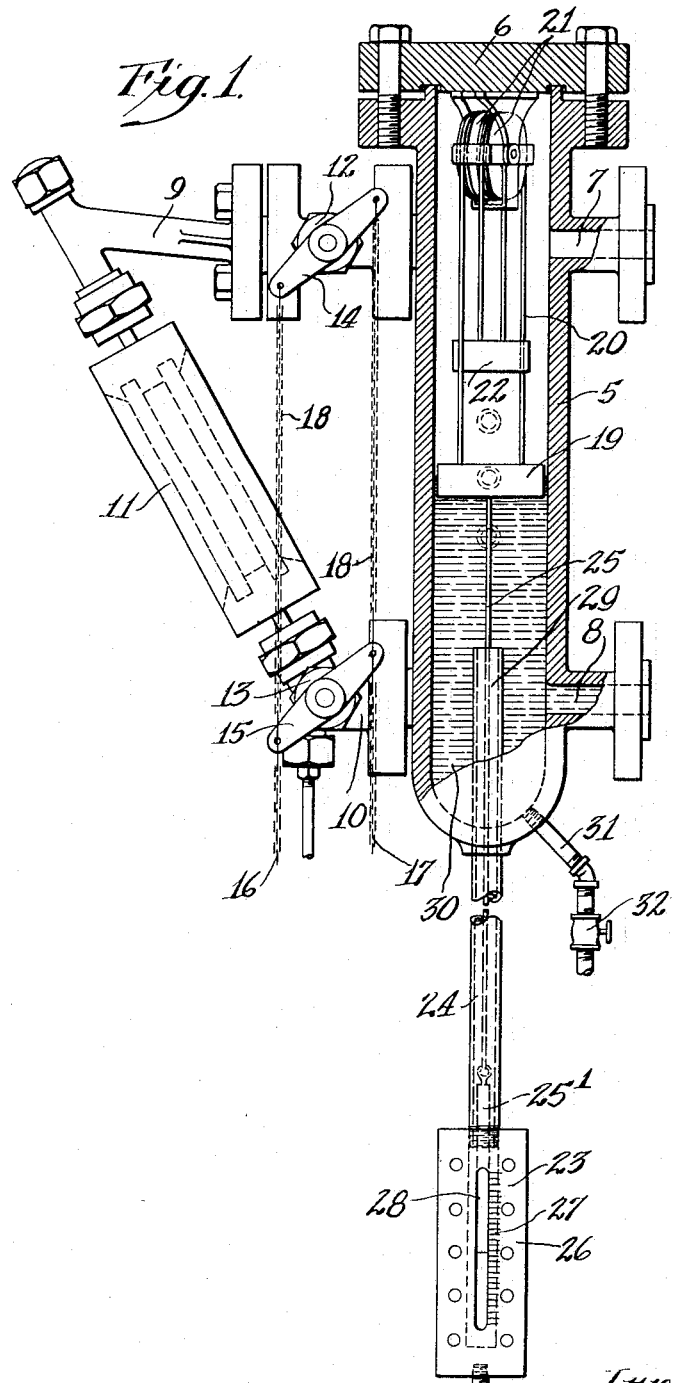

Oct. 31, 1933.  D. R. YARNALL  1,933,132

INDICATOR FOR WATER LEVELS

Filed May 28, 1931

Witnesses:
Geo. C. Jepson
Elmer W. Hacker

Inventor
David Robert Yarnall
by Wm. Steell Jackson and Son
Attorneys

Patented Oct. 31, 1933

1,933,132

UNITED STATES PATENT OFFICE 1,933,132

INDICATOR FOR WATER LEVELS

David Robert Yarnall, Germantown, Pa., assignor to Yarnall-Waring Company, Philadelphia, Pa., a corporation of Pennsylvania Application May 28, 1931. Serial No. 540,528

3 Claims. (Cl. 73—82)

My invention relates to water gauges for boilers of a type in which the water level is located high above the operating floor of the boiler room and from which water gauge or water level indication or record is to be provided so that the reading can be taken at the floor, or at some other point beneath the water level.

The main general purpose of my invention is to avoid subjecting the gauge to high temperatures.

A further purpose is to prevent or greatly reduce necessity for blow-off at the gauge and thus avoid objectionable high water temperatures there.

A further purpose is to provide a depending connection between a float at the water level and an indicator or recorder at a point below the level and to protect the path through which the connection passes from sediment.

A further purpose is to provide a water glass beneath the water level and in fluid communication therewith, with a sediment shield to prevent passage of sediment along with the water.

A further purpose is to extend a downwardly directed indicator casing upwardly into a water column to form a sediment basin, extending it high enough to be above the level of the inlet from the boiler water connection.

Further purposes will appear in the specification and in the claims.

I have preferred to illustrate my invention by a single view only of my preferred form. This preferred form has been selected not only because it has proved to be practical, efficient and highly successful, but primarily because it well illustrates the principles of my invention.

The figure is a side elevation partly in section, showing a water glass at the water level and a plain auxiliary water glass below this level.

In the drawing similar numerals indicate like parts.

With increasing boiler pressures and with increasing sizes of the boiler unit it has become more and more difficult to keep track of the height of water in the boiler from the floor of the boiler room.

When the height of boilers had become too high for the gauge glass to be viewed directly, the condition was somewhat relieved by the use of the inclined water gauge at the water level in the figure. It is there shown in order to indicate that my present invention is supplemental to any such glass and in no way inconsistent with the use of a water level glass of any character in case another glass is desired.

When the inclined glass was no longer fully satisfactory various forms of supplemental gauge beneath the water level gauge were proposed with connections between to reproduce the reading which would otherwise be had at the gauge glass. Some of these included a sight indicator in fluid communication with the bottom of a water column. These had serious disadvantages. They could not keep the temperature of the water in the submerged gauge low and at the same time keep this gauge clean. In the gauge glass art excessive temperatures cause the etching of exposed glass.

A further difficulty which arose in the attempts to extend fluid connection from an upper water column to any visual indicating or recording gauge beneath it, lies in the fact that the sediment from the water in the water column settles objectionably into the lower gauge and there obscures the reading and clogs the operation of any visual indicator which is operated in this supplemental gauge. My invention is intended to overcome both of these difficulties.

Describing the structure of the figure, I show a water column 5, suitably closed at the top by a bolted cap 6 and having steam and water inlet connections at 7 and 8. In order to show that my invention may be supplemental to any other type of water gauge, such, for example as an inclined water level gauge, the upper and lower parts of the column are here connected through passages 9 and 10 with a water glass 11, shown as of the flat glass variety. The passages are controlled by valves 12, 13 whose elements are moved through rocking levers 14 and 15 operated by chains 16, 17 and 18.

The detail and even the fact of the existence of a water level gauge are immaterial to the operation of the rest of the mechanism and are shown in this view for the purpose of having one view illustrate the setting in which the invention would commonly appear and the fact that the gauge at the floor is auxiliary to a water column rather than to a water glass. The water column may be a main column or an auxiliary water column.

Within the water column I show a float mechanism of the solid weight or displacement variety having the lower block 19 flexibly connected at 20 over pulleys 21 with a counterweight 22 so that the block 19 will respond to the height of liquid within the column.

As the lower weight or displacement member 19 rises and falls with the change of water level it affords an accurate basis for auxiliary gauge use. The water column is connected with the lower gauge 23 by a tube or pipe 24 within which depends a flexible connection 25 which terminates in an indicating tube, rod or other gauge member 25' which is aligned with any indicator 26 so that the bottom, or the top, or any marked portion on the indicator may be read against the scale 27 upon the surface of the gauge adjoining the side opening 28.

The character of indicator below is not material to the broader features of my invention and disclosure of a flat glass type of visual indicator is not intended to suggest that the flat form is any better for the purpose than the round. Moreover the sight indicator shown in the figure is not selected to imply that this is the only type which will operate, nor that other types of indication may not be used in conjunction with it.

The flexible connection 25 passes down through a guard 29 which may be an upward extension of tubing 24. Its effect is to insure settling of the sediment within the water in the space 30 in the lower part of the water column 5. Various advantages accrue from trapping the sediment in the space 30. The space is so much larger in volume per unit height than is the space within the water glass indicator that the water may be allowed to settle for a much longer time before blowing off. The blowing off of the sediment from the space 30 through blow-off pipe 31 controlled by valve 32 can be effected without in any way altering the flow of water to the indicator 23 with the result that the connection 24 and the space within the indicator 23 may be maintained as a dead end, keeping the water cool in this dead end of the system and hence avoiding the difficulties of glass etching of the indicator surface which result from excessive temperatures with or without excessive pressures.

In the figure the guard for the chain, which closes its space off from the lower part of the water column, forms an extension of the tube 24. Whatever the fact as to the formation of the guard or shield, it serves an additional function also as acting as a stop to limit lower movement of the solid displacement member which constitutes the "float" and which moves with the water.

The valved discharge pipe 33 is intended as a drain rather than as a blow-off.

However it not only makes it possible to free the lower water column from sediment but provides the operator on each shift with means for testing to see whether the indicator weight be free and the indication be reliable.

The drain can be quite small and may be used for such slight discharge as will keep the lower indicating surfaces free from clouding. Whatever the drainage permitted at this point it is desirable not to drain rapidly enough to excessively heat the water in the lower indicator.

It will be evident that my invention is applicable to any kind of an indicating or recording device involving movement of members within an auxiliary gauge.

A part of the advantage of having the casing extend upwardly into the water tube to form an annular sediment chamber lies in extending this casing beyond the inlet water connection from the boiler so that the water as it comes in from the boiler carrying the sediment entrain will not normally pass across the top of the extended casing, reducing the opportunity for passage of sediment down into the upper end of the casing and reducing the necessity for closeness of fit of the top of the casing with the connection by which the lower indicator is supported.

It will be evident that the protection at the top of the flexible suspension and by which sediment is prevented from following the suspension below the water column is of benefit in conjunction with whatever suspension be used in preventing undue accumulation of sediment about the suspension.

It will be evident that my gauge is well suited for floor gauge purposes and requires a minimum of attention and at the same time secures a maximum clearness of indication.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. In boiler indicator mechanism, a water column, a float in the water column, steam and water boiler connections with the column respectively, above and below the water level, a casing extending below the level of the water column and up above the bottom of the column and above the boiler water connection into communication with the water in the water column, forming an annular settling chamber between the extended casing and the water column in the bottom of the water column and below the water boiler connection, an indicating member within the casing and a connection between the float and indicating member.

2. In boiler indicator mechanism, a water column, a float in the water column, steam and water boiler connections with the column respectively, above and below the water level, a casing extending below the level of the water column and up above the bottom of the column and above the boiler water connection into communication with the water in the water column, forming an annular settling chamber between the extended casing and the water column in the bottom of the water column and below the water boiler connection, a blow-off from the bottom of the annular settling chamber, an indicating member within the casing and a connection between the float and indicating member.

3. In boiler indicator mechanism, a water column, a float in the water column, steam and water boiler connections with the column respectively, above and below the water level, a casing extending below the level of the water column and up above the bottom of the column and above the boiler water connection into communication with the water in the water column, forming an annular settling chamber between the extended casing and the water column in the bottom of the water column and below the water boiler connection, a blow-off from the bottom of the annular settling chamber, an indicating member within the casing, a connection between the float and indicating member and a blow-off for the bottom of the casing.

DAVID ROBERT YARNALL.